United States Patent [19]
Johnson et al.

[11] Patent Number: 5,820,035
[45] Date of Patent: Oct. 13, 1998

[54] BROADCAST SPREADER MECHANISM

[76] Inventors: John B. Johnson, P.O. Box 2065, Bandera, Tex. 78003; William Larry Johnson, 13914 Dove Hollow, San Antonio, Tex. 78232

[21] Appl. No.: 627,416

[22] Filed: Apr. 4, 1996

[51] Int. Cl.$^6$ .................................................. A01C 17/00
[52] U.S. Cl. .................... 239/684; 239/687; 251/129.11; 251/272; 74/89.15; 74/526
[58] Field of Search ...................... 239/681, 684, 239/687, 650, 70, 456, 498, 505–507, 513–515, 518, 665, 666; 119/57.91, 57.92, 51.11, 51.04; 251/129.11, 272; 74/89.15, 526

[56] References Cited

U.S. PATENT DOCUMENTS

| | | | |
|---|---|---|---|
| 396,251 | 1/1889 | Adamson | 239/684 |
| 2,506,382 | 5/1950 | Pazandak | 74/89.15 |
| 2,934,037 | 4/1960 | Ernest | 239/650 |
| 3,195,508 | 7/1965 | Lehman et al. | 119/51.11 |
| 3,537,649 | 11/1970 | Van Der Lely et al. | 239/666 |
| 3,698,574 | 10/1972 | Louks | 239/687 |
| 4,027,627 | 6/1977 | Fillion | 119/51.11 |
| 4,106,704 | 8/1978 | McRoskey et al. | 239/687 |
| 4,497,446 | 2/1985 | Van Der Lely et al. | 239/661 |
| 4,565,159 | 1/1986 | Sweeney | 119/53 |
| 4,945,859 | 8/1990 | Churchwell | 119/57.91 |
| 4,986,220 | 1/1991 | Reneau et al. | 119/57.91 |
| 5,046,664 | 9/1991 | Van Der Lely et al. | 239/661 |
| 5,105,766 | 4/1992 | Montgomery | 119/57.91 |
| 5,143,289 | 9/1992 | Gresham et al. | 239/7 |
| 5,572,949 | 11/1996 | Bryant, Jr. et al. | 119/57.91 |

*Primary Examiner*—Andres Kashnikow
*Assistant Examiner*—Lisa Ann Douglas
*Attorney, Agent, or Firm*—Glenna Hendricks; Stephen Gates

[57] ABSTRACT

An improved feed distribution and closure mechanism for use with broadcast spreaders for spreading granular or powdery material or both is described. The mechanism comprises a threaded shaft, a disk mounted on the shaft having a central opening provided with internal threads mating with the shaft, a return spring, and a collar or the like on the shaft to stop travel of the disk on the shaft. Materials which may be spread using spreaders equipped with the mechanism include, without limitation, sand and/or salt on roads; materials such as herbicides, pesticides, fertilizer, lime and seeds such as grass seed on fields, lawns, golf courses and the like; and most particularly, feed for both domesticated and game animals and birds.

6 Claims, 3 Drawing Sheets

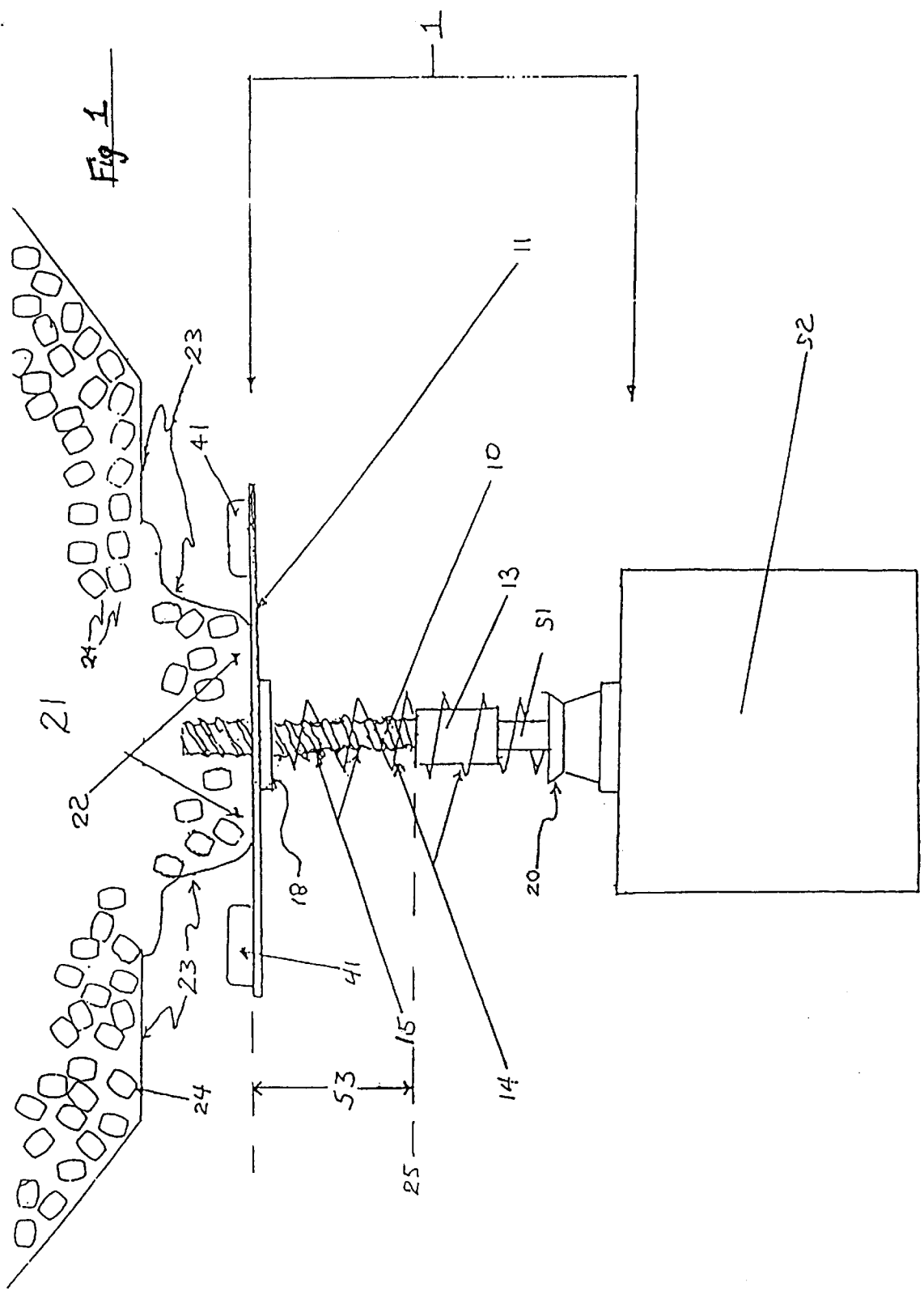

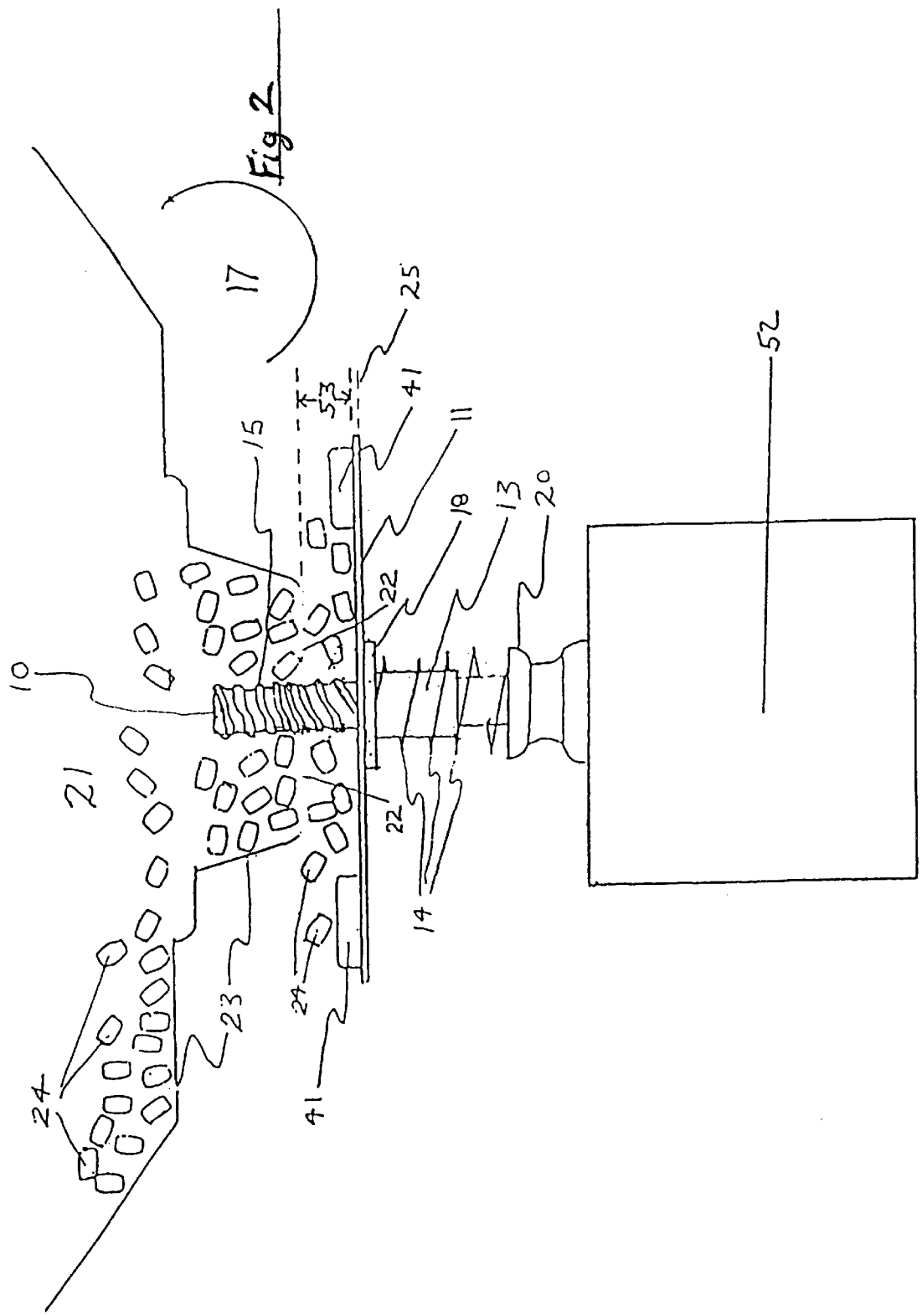

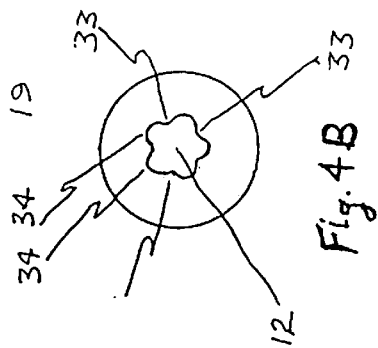
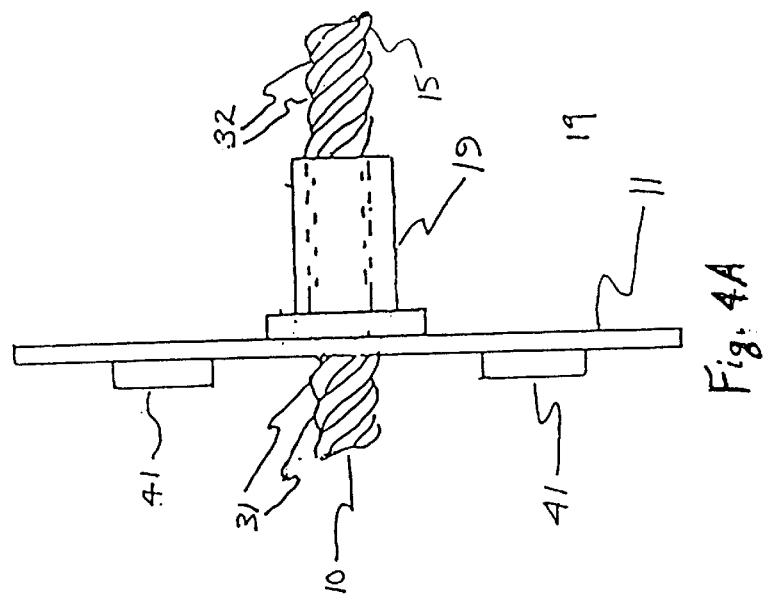
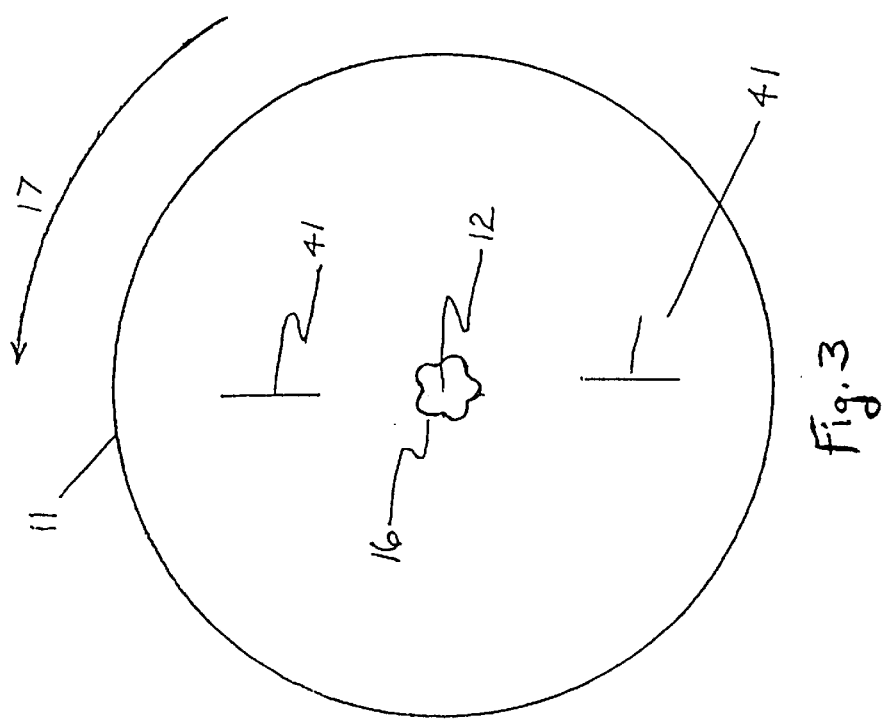

BROADCAST SPREADER MECHANISM

FIELD OF THE INVENTION

This invention relates to an improved feed distribution and closure mechanism for use with broadcast spreaders for spreading granular or powdery material or both. Materials which may be spread using such spreaders include, without limitation, sand and/or salt on roads; materials such as herbicides, pesticides, fertilizer, lime and seeds such as grass seed on fields, lawns, golf courses and the like; and most particularly, feed for both domesticated and game animals and birds. In many parts of the country it is customary to spread feed such as kernels of corn or protein supplements in order to attract and promote the growth of game animals and birds.

BACKGROUND OF THE INVENTION

A common type of broadcast spreader comprises
a container for the material to be spread having at least one outlet port,
a distribution member mounted for rotation about an upwardly extending rotary axis (referred to hereinafter as a "spinning disk"),
and means for rotating the distribution member.

Some types of such spreaders have means for closing the outlet port or ports such as sliding gates and the like, others have no closure means, but instead when the spinning disk is stopped the material to be spread piles up on the spinning disk to block the outlet port.

Such spreaders may be mounted on a self-propelled vehicle such as a tractor, an all-terrain vehicle, a utility vehicle, a truck or the like or it may be mounted on wheels and pushed by the operator, or alternatively may be stationary as is the case for those commonly used for feeding game or those attached to a dock, flotation device or the like for feeding fish.

It has been found in practice that the mechanisms used to start and stop the feed from the outlet port of such broadcast spreaders are inadequate. When no closure means is employed feed continues until the disk stops spinning, and in addition, the accumulation of material on the disk often not very effective in stopping the feed, especially when the apparatus is bumped or jiggled. When positive closure means are used they often do not close tightly enough to prevent leakage and/or jam on material passing through the outlet as it is being closed. Failure of a mechanism to close the port quickly and firmly causes material to spill wastefully, and in the case of fertilizers, herbicides and the like, such excess amounts in one place may cause damage to the crop. If an apparatus lacks closure means, or has means which do not close tightly, a moisture-sensitive material to be spread will not be protected from moisture.

A stationary feeder is described in U.S. Pat. No. 4,986,220 to Reneau et al. The apparatus comprises a motor-driven spinning disk which is configured to cut off any "trash" extending down from the outlet, and uses a swinging gate or gates activated by centrifugal force to close the outlet and prevent material feeding except when the motor is running. Such a closure arrangement would not be suitable for use in a moving spreader because vibration, bumps and the like would tend to open the gates and spill material. In static spreaders animals such as mice, rats, squirrels, raccoons, wild pigs, birds and the like quickly learn how to activate or open the gates to obtain a free meal.

Another type of static feeder is described in U.S. Pat. No. 5,143,289 to Gresham et al. which uses a distributor with raised sides having slots which surrounds the feed opening of the container holding the material to be dispersed. The apparatus allows material to pile up on the distributor when it is at rest and material is dispersed through the slots when the distributor starts to turn. The apparatus lacks any means to completely close the material container when it is at rest, so as in the case of the Reneau apparatus, it is susceptible to spilling feed through the slots when the distributor continues turning when the drive is stopped. When the apparatus is bumped or jiggled there is no way to prevent material from being shaken off through the slots, which causes additional material to feed onto the distributor. Such an arrangement would be totally unsuitable for use on moving equipment. Even when it is used as intended for distributing feed, when squirrels, birds, raccoons and the like take food from the distributor the apparatus lacks means to prevent more feed from running out of the container to replace it.

Other static feeders using spinning disks to distribute material known to the art include Ernest, U.S. Pat. No. 2,934,037, Lehman, U.S. Pat. No. 3,195,508 and Fillion, U.S. Pat. No. 4,027,627 all of which lack any positive closure for the feed container. Churchwell U.S. Pat. No. 4,945,859 and Montgomery U.S. Pat. No. 5,105,766 describe static feeders having a positive closure for the feed material which is opened by wind or a motor (Churchwell), or by being bumped by an animal (Montgomery). Both lack means such as a spinning disk to broadcast material and merely drop it to the ground by simple gravity.

Van der Lely et al. U.S. Pat. No. 4,497,446 describes a spreader intended for use on a moving vehicle. Spreading is accomplished by means of a spinning disk which is fed from a hopper having a conical lower portion equipped with outlet ports. Feed through the outlet ports is controlled by a moveable sleeve which fits closely over the conical portion of the hopper and has indentations which, when positioned over the ports, allow material to feed to the spinning disk below. The van der Lely apparatus has positive closure means, thus enabling its use on a moving vehicle, but the closure means is controlled separately from the spinning disk and thus requires separate control means from those for the spinning disk.

SUMMARY OF THE INVENTION

The present invention comprises an improved spinning disk broadcast spreader apparatus and method for dispersing powdered or granular feeds such as sand, salt, fertilizer, lime, grain, seed and the like. One advantage of the invention is that feed to the spinning disk begins when the disk begins turning. Another advantage is that it provides a quick positive closure of feed to the spinning disk as soon as the motive power for the disk is stopped, thus avoiding unwanted spilling of the feed material. Still another advantage of the invention is that the closure prevents unwanted dispersal of the feed material when the spreader is moving with the spinning disk stationary. Still another advantage of the present invention is that when it used in static feeders for fish and game, nuisances such as birds, squirrels and raccoons are unable to get at the feed material. An additional advantage of the positive closure is that it will keep moisture away from moisture-sensitive materials These and other advantages are provided by an improved broadcast spreading apparatus for simultaneously driving (and stopping) the spinning disk and opening (and closing) the outlet port of a feed hopper or container. The apparatus comprises a drive shaft having a steep spiral thread pitched in the direction of rotation of the shaft, a rotating device or spinning disk having a central opening equipped with mating female threads mounted on the shaft, a return spring, and, optionally, a stopping means on the shaft at the lower end of the spiral thread, all attached to a driving means for the shaft. The apparatus may be mounted by any convenient means underneath a feed container or hopper and aligned with an outlet port in the bottom surface of the hopper which projects downward from the base of the hopper sufficiently to mate firmly with the surface of the spinning disk and to afford clearance for any projecting fins or the like on the disk.

When the drive shaft begins turning, the spiral thread on the shaft begins drawing the spinning disk away from the outlet of the hopper, allowing feed to begin flowing onto the disk and when the disk reaches the end of its travel on the spiral it commences spinning. When the drive shaft is stopped the centrifugal force acting on the disk drives it back up the spiral until it comes to a stop at the hopper outlet where it is held in place by the spring.

BRIEF DESCRIPTION OF THE DRAWINGS

FIG. 1 is a side cross-sectional view of a hopper with the apparatus of the invention attached with the spinning disk at rest (power off) when it is attached to a hopper.

FIG. 2 is a side cross-sectional view of the apparatus in use (power on) when it is attached to a hopper.

FIG. 3 shows a top view of a typical disk mounted on a spiral threaded shaft showing a cross-sectional view of a typical spiral threaded shaft and the mating opening in the disk.

FIG. 4 shows end and side views of a nut suitable for supplying the mating threads in the disk opening mounted on a spiral threaded shaft.

DETAILED DESCRIPTION OF THE INVENTION

As shown in FIG. 1, the spreading/closure apparatus 1 of the invention comprising a shaft 10 having a coarse spiral thread 15, a disk 11 having a central opening 12 (see FIG. 3) provided with an internal thread 16 (FIG. 3) which mates with the shaft thread 15, mounted on the shaft, a return spring 14 and, optionally, a stopping means 13, is firmly suspended by any suitable means (not shown) below a hopper 21 and aligned with an outlet port 22 in the bottom surface 23 of the hopper which contains powdered, granular or aggregate material 24 which is to be spread. The shaft 10 is driven by any convenient power source 52, including, without limitation, an electric motor, a gasoline or diesel engine, a vehicle power take-off shaft, or gearing from the turning wheel(s) of a vehicle on which it is mounted.

As shown in FIG. 1, when the shaft 10 is not turning, the return spring 14 holds the disk 11 against the outlet port 22, preventing the contents of the hopper 21 from flowing out onto the disk. As shown in FIG. 2, when the shaft 10 begins turning in direction 17, after it has made as many rotations as there are thread turns between the rest position of the disk 11 and its stopping point 25 (which in a preferred embodiment may be the position of the stopping means 13), the spiral thread 15 on the shaft 10 turning in the mating thread 16 (see FIG. 3) in the disk 11 will have drawn the disk 11 down to the stopping point 25, whereupon the disk 11 will attain the speed of rotation of the shaft 10. When the shaft 10 slows down and stops turning when the power source 52 is stopped or disconnected, the centrifugal force of the spinning disk 11, aided by the return spring 14 causes the disk to wind back up the shaft 10 on the spiral thread 15 until it comes to a stop against the hopper outlet 22 after it has made as many rotations as there are thread turns between the rest position and the stopping point 25, whereupon the return spring 14 further assists in holding the disk 11 in the closed (raised) position.

The shaft 10 and mating opening 12 in the disk 11 are shown in FIGS. 3A, 4A and 4B in detail. It has been found that when the pitch of the spiral 15 (FIG. 4A) is more than about 5 turns/inch the mating thread 16 of the disk 11 (FIG. 3) will not move freely enough to cause the disk to move away from the opening of the hopper. If the pitch is much less than about 1 turn/inch, the rotation of the shaft 10 may not deliver sufficient force to cause the disk 11 to wind down the shaft. Routine experimentation will enable one skilled in the art to determine the best pitch for a particular application. The number of threads is not critical, and may be any number which conveniently fit on the diameter of the shaft. When the spiral is turning it must deliver sufficient force to the disk 11 to cause it to move downward, and when it stops, it must allow the centrifugal force of the disk and the return spring 14 to move the disk upward. One thread is sufficient, but at least three are preferred, in order to impart stability to the disk by offering it multiple points of support. If too large a number of threads for the shaft diameter is used the threads will be too fine and may create enough friction with the mating threads to prevent easy movement of the disk. Selection of the proper number to accomplish the purpose of the invention is well within the skill of the art. The spiral threads 15 and 16 are preferably made with very smooth surfaces to reduce friction. The edges of the thread ridges 31 and 33 and the bottoms of the grooves 32 and 33 should be smoothly rounded as shown in the cross-sections in FIGS. 4A and 4B.

The spiral threaded shaft 10 may be made of any material which can withstand the operating conditions under which the apparatus will be used. The length of the shaft 10 should be at least enough to allow it to reach the opening 22 of the hopper 21 when the apparatus is mounted for use (FIG. 1). It has been found that when the shaft 10 is long enough to reach beyond the disk 11 into the opening 22 the rotation of the spiral thread 15 in the material 22 when it is turning appears to help break up packed material and maintain an even flow through the opening 22 down onto the spinning disk 11. Stainless steel has been found to be a particularly suitable material for the shaft 10.

Returning to FIGS. 1–2, the spinning disk 11 should be rigid and kept reasonably light in order to ease its movement up and down the shaft 10. The disk may be made of metal or plastic, the choice of materials is well within the skill of the art. The disk 11 is shown with projecting flaps 41 which guide the feed 24 and throw it from the spinning disk. The use of such aids to guide the feed and the design and number of such projections, if any, is not critical to the practice of the invention, and may be chosen by one skilled in the art as needed for a particular purpose.

It has been found particularly useful to supply the mating threads 16 for the central opening 12 of the disk by attaching a nut 19 (FIGS. 4A and 4B) having suitable internal threads over the opening 12 by any suitable means such as gluing, bolting, screwing, welding, soldering or the like, or it may fabricated as an integral part of the disk. An attached nut 19 may be made of any metal or plastic suitable for use under the use conditions anticipated. Polyacetal resin has been found to be a particularly suitable material.

The strength and design of the return spring 14 are not critical to the invention. The spring, although it also assists in returning the disk to the closed position when the shaft 10 stops turning, primarily serves to prevent downward movement of the disk 11 when the apparatus is at rest, and therefore should be strong enough to do so. Selection of an appropriate spring may be accomplished readily without undue experimentation. In order to reduce friction it is preferred to install a thrust washer, bearing or like means 18 between the upper end of the spring 14 and the disk 11. The lower end of the spring 14 must be supported by a bearing surface 20, and it has been found convenient to utilize a washer, bearing or like means where the power shaft 51 emerges from the power source 52 as the bearing surface 20 (shown as a cup washer in FIGS. 1–2).

The width of the opening 53 between the disk 11 and the hopper opening 22 must be at least great enough to allow the material 24 to pass between the surface of the disk and the mouth of the opening. The width of the opening 53 combined with the speed of rotation of the disk determines the spreading rate. The distance 53 may be established either by varying the distance the disk 11 travels down the shaft 10 when the shaft is turning, the placement of the apparatus 1 with respect to the hopper 21, or both.

The stopping point 25 is the limit of the downward travel of the disk 11 when the shaft 10 is turning and thus defines the distance 53 between the spinning disk 11 and the hopper port 22 when the disk is moving. The stopping point 25 is determined by a stopping means. In cases where a fixed distance 53 is desired the stopping point 25 may be defined by selecting the compressive resistance of the spring 14 to be sufficient to balance the downward forces acting on the disk at the desired point, thus creating a stopping means, or the stopping means may be created by ending cutting of the threads 15 at the desired point 25 on the shaft 10, installing or cutting a raised shoulder or ridge at point 25, or other equivalent means for stopping the downward travel of the disk 11 at a desired point 25. It is preferred to provide a stopping means by mounting a collar 13 or like stopping means around the shaft with its upper surface at the stopping point 25, held in the desired position by means such as a setscrew. It has been found particularly convenient to connect the threaded shaft 10 to the shaft 51 of a power source 52 using a coupler which also acts as a collar 13 to afford the stopping means.

The apparatus of the invention is useful in broadcast spreaders for a wide variety of particulate materials including without limitation powdery ones such as lime and the like; fine ones such as seeds; granular aggregates such as fertilizer, herbicides and pesticides; grain and other animal feeds; salt, sand or salt-sand mixtures for treating roadways; and the like. The apparatus may be used in a variety of ways, including without limitation, mounting on a vehicle such as a tractor, truck, all-terrain vehicle or the like; incorporation into an apparatus pushed by the user such as a broadcast lawn spreader; or as a stationary animal feeder.

We claim:

1. A distribution member and closure means apparatus for a broadcast spreader which comprises a threaded shaft, a disk mounted on the shaft having a central opening provided with internal threads mating with the shaft, a power source capable of causing the shaft to rotate thus causing the disk to travel on the shaft, a return spring, and stopping means for stopping the travel of the disk on the shaft, said apparatus being adapted to be fastened beneath a bottom outlet port of a hopper containing material to be spread such that the disk closes the port when the shaft ceases to rotate.

2. The apparatus of claim 1 wherein the mating internal threads of the disk are provided by an internally threaded nut attached to the disk.

3. The apparatus of claim 1 wherein the stopping means comprises a collar placed around the shaft.

4. A broadcast spreader which comprises a container for material to be spread having at least one outlet port in its under surface;

a distribution member and closure means for rotation about an upwardly extending rotary axis which further comprises a threaded shaft, a disk mounted on the shaft having a central opening provided with internal threads mating with the shaft, a return spring, and stopping means for stopping the travel of the disk on the shaft, mounted beneath and aligned with said port;

and means for rotating the distribution member.

5. The apparatus of claim 4 wherein the mating internal threads of the disk are provided by an internally threaded nut attached to the disk.

6. The apparatus of claim 4 wherein the stopping means comprises a collar placed around the shaft.

\* \* \* \* \*